US007664139B2

(12) United States Patent
Loprieno et al.

(10) Patent No.: US 7,664,139 B2
(45) Date of Patent: Feb. 16, 2010

(54) METHOD AND APPARATUS FOR USING STUFFING BYTES OVER A G.709 SIGNAL TO CARRY MULTIPLE STREAMS

(75) Inventors: Gilberto Loprieno, Milan (IT); Michael W. Truskowski, Ladue, MO (US)

(73) Assignee: Cisco Technology, Inc., San Jose, CA (US)

( * ) Notice: Subject to any disclaimer, the term of this patent is extended or adjusted under 35 U.S.C. 154(b) by 668 days.

(21) Appl. No.: 11/162,619

(22) Filed: Sep. 16, 2005

(65) Prior Publication Data

US 2007/0076767 A1 Apr. 5, 2007

(51) Int. Cl.
*H04J 3/02* (2006.01)
(52) U.S. Cl. ................. 370/472; 370/474; 370/476
(58) Field of Classification Search ............ 370/465, 370/468, 469, 470–476; 398/49, 58, 66–69, 398/98
See application file for complete search history.

(56) References Cited

U.S. PATENT DOCUMENTS

| 6,108,337 A * | 8/2000 | Sherman et al. ............. 370/401 |
| 6,198,754 B1 * | 3/2001 | Nakayama .................. 370/536 |
| 6,636,529 B1 * | 10/2003 | Goodman et al. ........... 370/469 |
| 7,042,908 B1 * | 5/2006 | Mayer ........................ 370/503 |
| 2002/0131408 A1 * | 9/2002 | Hsu et al. .................... 370/355 |
| 2003/0133475 A1 * | 7/2003 | Solheim et al. ............. 370/532 |
| 2004/0170201 A1 * | 9/2004 | Kubo et al. ................. 370/535 |
| 2004/0252995 A1 * | 12/2004 | Ovadia et al. ................. 398/54 |
| 2006/0098674 A1 * | 5/2006 | Hamasaki et al. ........... 370/412 |
| 2006/0239262 A1 * | 10/2006 | Wu et al. .................... 370/389 |

* cited by examiner

*Primary Examiner*—William Trost, IV
*Assistant Examiner*—Roberta A Shand

(57) ABSTRACT

Methods and apparatus for allowing containers in an optical transport network to be shared between users are disclosed. According to one aspect of the present invention, a first network element that is a part of an optical transport network includes a frame generator and an output arrangement. The frame generator creates a frame with a fixed stuff area that includes a first set of bits that provide channel identification information, a second set of bits that provide justification information, and a third set of bits that indicate either or both payload type information and client signal fail information. The output arrangement places the frame within a container for transport through the optical transport network. The bandwidth of the container is arranged to be utilized by a plurality of network elements including the first network element.

29 Claims, 7 Drawing Sheets

METHOD AND APPARATUS FOR USING STUFFING BYTES OVER A G.709 SIGNAL TO CARRY MULTIPLE STREAMS

BACKGROUND OF THE INVENTION

1. Field of Invention

The present invention relates generally to optical network systems. More particularly, the present invention relates to systems and methods for allowing the bandwidth in containers to be shared by different users.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include packet-based traffic such as voice, video and data carried within an Ethernet frame.

To address the demand for data communication services, the use of optical networks, such as a synchronous optical network (SONET) and a synchronous digital hierarchy (SDH) network, has become more prevalent. The ever-increasing demand for greater bandwidth in SONET and SDH networks has been achieved by increasing line rates using time-division multiplexing (TDM) and transmitting multiple wavelengths through single fibers using dense wave division multiplexing (DWDM).

ITU-T G.709 "Interface for the optical transport network (OTN)," which is incorporated herein by reference in its entirety, describes a next-generation optical network that is capable of providing increased bandwidth over SONET and SDH networks. ITU-T G.709 describes three levels of bandwidth pertaining containers for different optical channel data units (ODUs). Containers, which are effectively payload envelopes, generally carry signals from a client or a user in a substantially bit-transparent manner. The bandwidth associated with each container may be used by only one clock-locked signal or user. An ODU1 container is arranged to carry up to approximately 2.5 Gigabits (G) of data from a user or a customer as a single channel. An ODU2 container is arranged to carry up to approximately 10 G of data from a user, either as one channel of approximately 10 Gigabits per second (Gbps) or as up to four channels of 2.5 Gbps. An ODU3 container is arranged to carry one signal of up to approximately 40 G from a user, or to carry up to four channels of 10 Gbps.

Containers are assigned to users to facilitate the transmission of data from the users to remote sites, e.g., network destinations. As shown in FIGS. 1A and 1B, a first user 102 has a container 114 that only first user 102 may use to send data to remote sites 110. A second user 106 has a container 118 that only second user 106 may use to send data to remote sites 110. Both first user 102 and second user 106 may send up to approximately 2.5 G using ODU1 containers, as indicated in FIG. 1A.

FIG. 2A is a diagrammatic representation of an ODU3 container and the potential channels that may be carried by the container. An ODU3 container 210, which may have an approximately 40 G capacity may, is assigned to a single user may carry a single channel 214 of up to approximately 40 Gbps. Alternatively, ODU3 container 210 may carry up to four channels 218 of up to approximately 10 Gbps that are associated with the single user.

When a container is used to its capacity of close to its capacity, i.e., when substantially all of the bandwidth allocated to a container is effectively used, the assignment of a single user to a container is relatively efficient. However, for instances in which the bandwidth of a container is underutilized, the assignment of a single user to a container may be relatively inefficient. By way of example, as shown in FIG. 2B, when a first container 260 that has an approximately 40 G capacity only carries a single channel 264 of up to approximately 10 Gbps and a second container 280 with an approximately 40 G capacity also only carries a single channel 284 of up to approximately 10 Gbps, each container 260, 280 wastes approximately 30 G of bandwidth. Between first container 260 and second container 280, approximately 60 G are effectively wasted. Wasting up to approximately 60 G of bandwidth may be significant, particularly since there may be other users within an optical network or circuit who would benefit from 60 G of bandwidth.

In general, wasting any amount of bandwidth in a container may be significant. For instance, for an ODU1 container with a capacity of approximately 2.5 G, any amount of the 2.5 G that is not used by the user to which the container is allocated is wasted in that no other user has access to that capacity. Similarly, for an ODU2 container with a capacity of approximately 10 G, any amount of the 10 G that is not used by the user to which the container is allocated is also effectively wasted.

Therefore, what is needed is an efficient method and apparatus for allowing the bandwidth in containers to be shared. That is, what is desired is a system that enables a plurality of users or customers to share the capacity of a container.

BRIEF DESCRIPTION OF THE DRAWINGS

The invention may best be understood by reference to the following description taken in conjunction with the accompanying drawings in which.

DETAILED DESCRIPTION OF THE EMBODIMENTS

Often, valuable bandwidth within a carrier transport network is effectively wasted when relatively high bandwidth containers are assigned to customers that do not use all of the bandwidth that is available to them. Enabling more than one customer to use a container within an optical network allows the bandwidth associated with the container to be more efficiently used. A container may be shared when the origin of a frame carried in the container is identifiable, or when the channel associated with the frame may be identified using the frame. By adding information into frames carried in a container, e.g., an optical transport network (OTN) container as described in ITU-T G.709 "Interface for the optical transport network (OTN)," the payload associated with a plurality of different customers may share the container. The information added into the frames may be in the form of stuffing bytes. Stuffing bytes may include bits that provide channel identification and, hence, enable an origin of a frame to be identified.

Figure 1A:
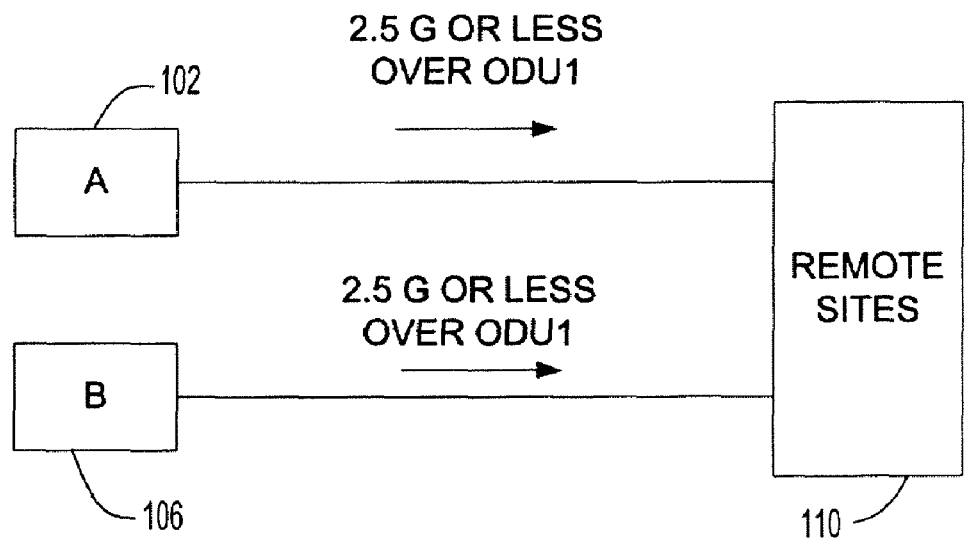
FIG. 1A is a diagrammatic representation of users that send data to remote sites using containers.
Figure 1B:
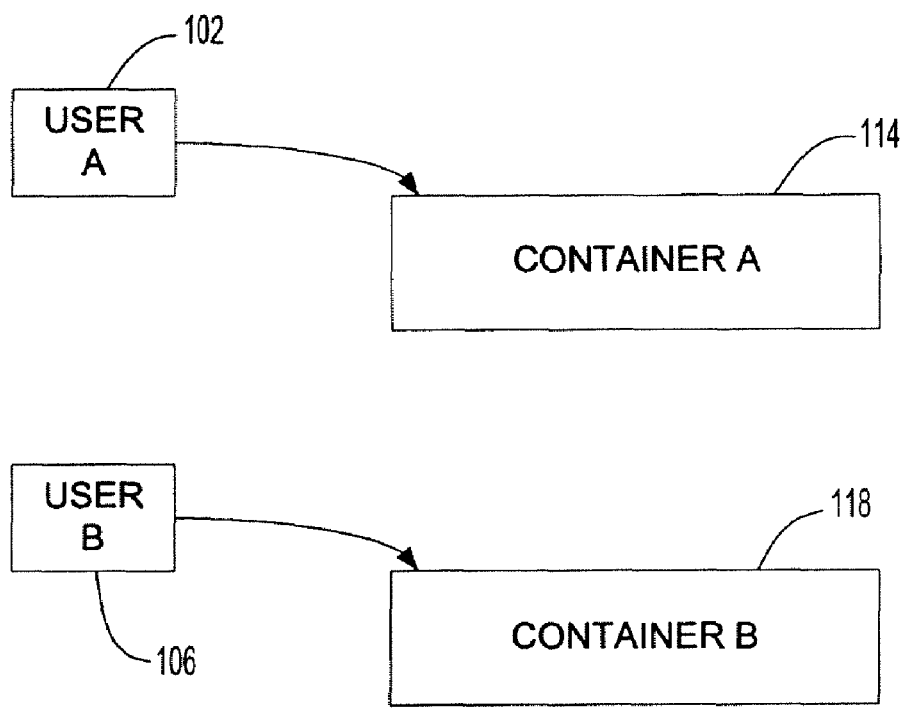
FIG. 1B is a diagrammatic representation of users with dedicated containers.
Figure 2A:
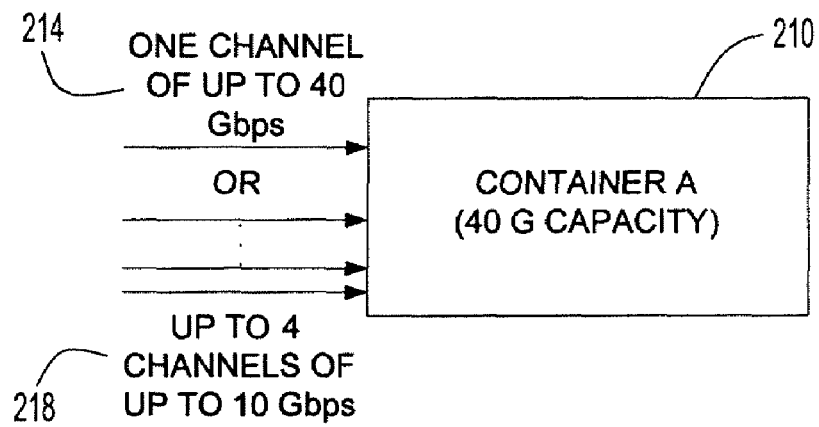
FIG. 2A is a diagrammatic representation of an ODU3 container and the potential channels that may be carried by the container.
Figure 2B:
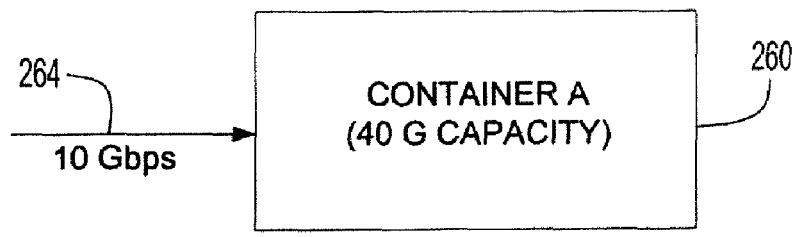
FIG. 2B is a diagrammatic representation of two ODU3 containers which are not used to capacity.
Figure 2B:
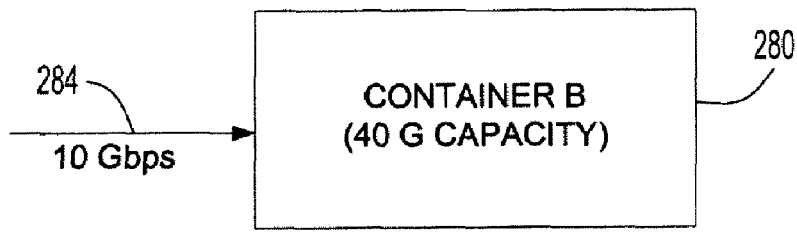
Figure 3:
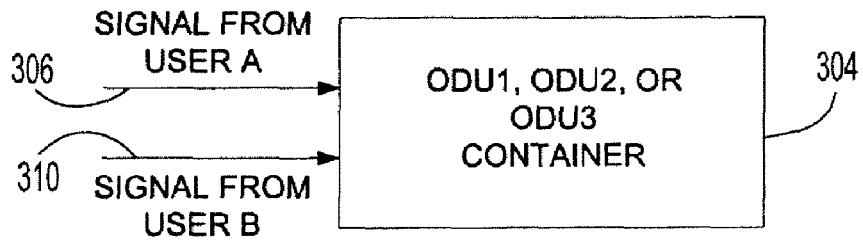
FIG. 3 is a diagrammatic representation of a container that is shared by more than one user in accordance with an embodiment of the present invention.

FIG. 3 is a diagrammatic representation of a container that is shared by a plurality of users in accordance with an embodiment of the present invention. An OTN G.709 container, e.g., an optical channel data unit (ODU) container 304, is arranged to accept a signal 306 from a first user and a signal 310 from a second user. That is, container 304 is assigned to both the first user and the second user such the available bandwidth associated with container 304 may be shared. For example, if container 304 is an ODU1 container, container 304 includes approximately 2.5 Gigabits (G) that may be shared. If container 304 is an ODU2 container, container 304 includes approximately 10 G that may be shared. In the event that container 304 is an ODU3 container, container 304 includes approximately 40 G that may be shared.

Stuffing bytes allow container 304 to be shared by effectively allowing for asynchronous mapping to occur for each channel or signal in container 304. The stuffing bytes may be configured to allow a channel, as well as a payload type, to be identified. Providing such identification allows a receiver of container to substantially determine the channel with which each frame is associated.

Figure 4:
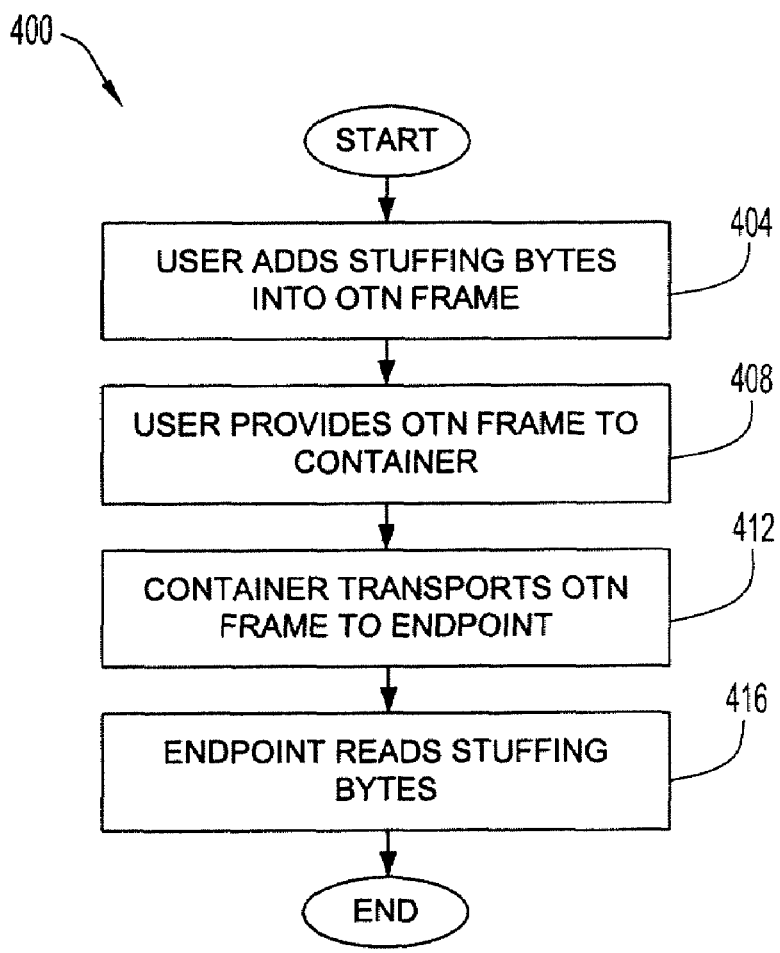
FIG. 4 is a process flow diagram which illustrates one method of utilizing stuffing bytes in accordance with an embodiment of the present invention.

Referring next to FIG. 4, the steps associated with one method of utilizing stuffing bytes to enable more than one user or customer to use a given container will be described in accordance with an embodiment of the present invention. A process 400 of utilizing stuffing bytes begins at step 404 in which a user, e.g., a network element associated with a user, adds stuffing bytes into an OTN frame. In the described embodiment, the OTN frame is a G.709 OTN frame that is specified in ITU-T G.709. An OTN frame generally includes an overhead area, a payload area, and a forward error control block. The stuffing bytes may be added into an OTN frame at the time that the OTN frame is created from a stream of data.

Once stuffing bytes are added to an OTN frame, the OTN frame is provided in step 408 to a container. The container may generally be any suitable container, e.g., an OTU or an ODU container. The container then transports the OTN frame to an endpoint in step 412. After the endpoint receives the container, the endpoint 416 reads or otherwise extracts the stuffing bytes 416. Reading the stuffing bytes allows the endpoint to substantially identify the user. Upon reading the stuffing bytes, the process of utilizing stuffing bytes is completed.

Figure 5:
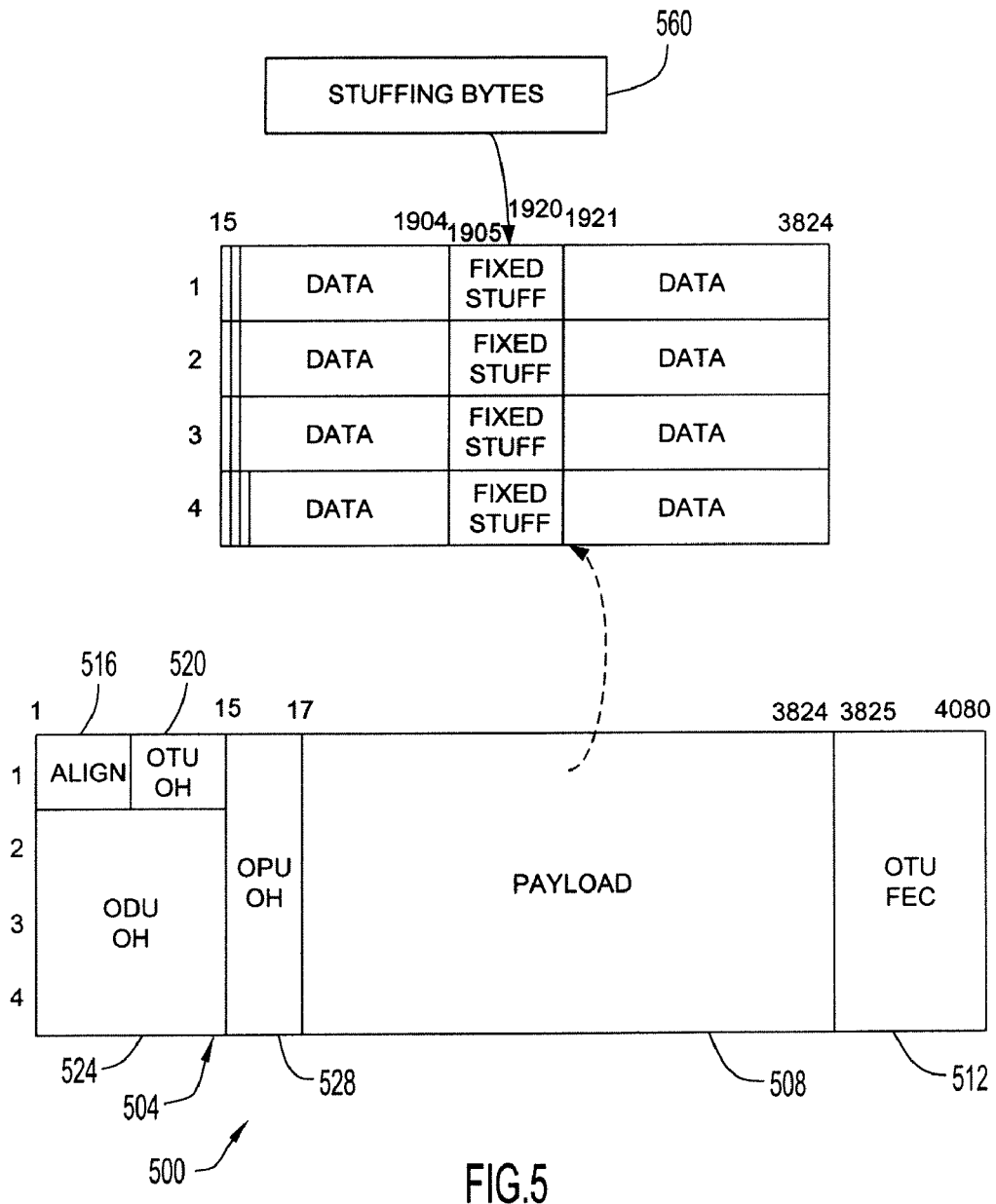
FIG. 5 is a diagrammatic representation of a placement of stuffing bytes relative to an OTN frame in accordance with an embodiment of the present invention.

The stuffing bytes which allow more than one user to use a given container may be placed, in one embodiment, in a payload area of an OTN frame. FIG. 5 is a diagrammatic representation of a placement of stuffing bytes relative to an OTN frame in accordance with an embodiment of the present invention. An OTN frame, as specified in the ITU-T G.709, generally includes four rows and includes three areas, an operation and maintenance (OAM) overhead area 504, a payload area 508, and a forward error correction (FEC) area 512. OAM area 504 includes a framing alignment overhead area 516, an optical channel transport unit (OTU) overhead area 520, an ODU overhead area 524, and an optical channel payload unit (OPU) overhead area 528.

Payload area 508, which contains the payload or the information that is to be transported by frame 500, may include fixed stuff bytes. The location of the fixed stuff bytes within payload area 508 may vary widely depending upon the data rate associated with frame 500. For example, a synchronous transport module level sixty four (STM-64) data rate or mapping in to an OPU2 frame, fixed stuff bytes may be located between bits 1905 and 1920, inclusive, within payload 508. Stuffing bytes 560, which allow for a container to be shared, may be inserted into the fixed stuff bytes.

Figure 6:
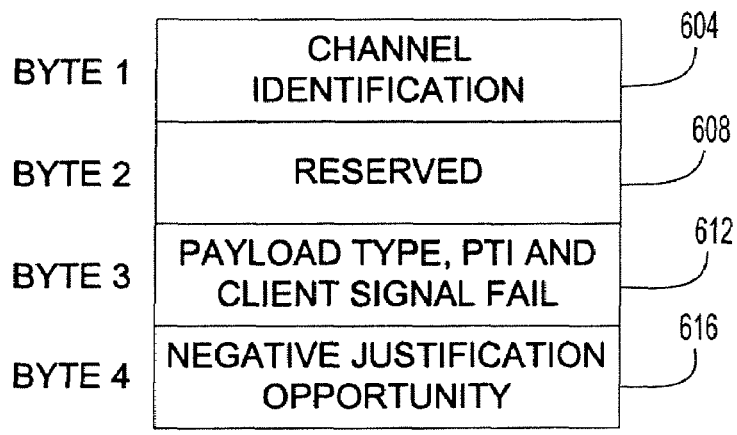
FIG. 6 is a block diagram representation of four stuffing bytes that may be placed in a payload area of an OTU frame in accordance with an embodiment of the present invention.

FIG. 6 is a block diagram representation of four stuffing bytes that may be placed in a payload area of an OTN frame in accordance with an embodiment of the present invention. Four stuffing bytes include a channel identification byte 604 that is arranged to include bits that identify the channel associated with the frame that the stuffing bytes are included in. More specifically, channel identification byte 604 effectively identifies the channel to which a particular customer has been assigned. A reserved byte 608 includes bits that are reserved for substantially any suitable purpose. A payload type, packet type identifier (PTI), and client signal fail byte 612 and a negative justification opportunity byte 616 are also included in the four stuffing bytes. Negative justification opportunity byte 616 is arranged to effectively provide compensation for any jitter or wander associated with a signal.

Figure 7A:
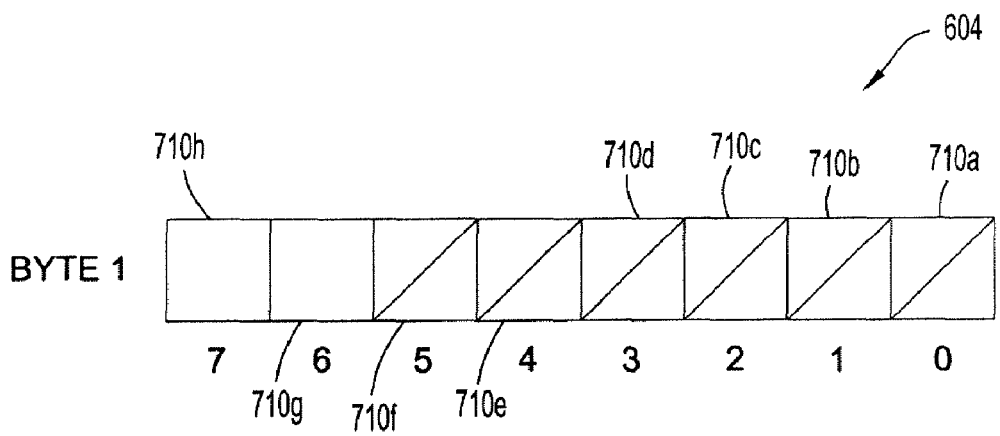
FIG. 7A is a block diagram representation of a channel identification byte, i.e., channel identification byte 604 of FIG. 6, in accordance with an embodiment of the present invention.

With reference to FIG. 7A, a channel identification byte, i.e., channel identification byte 604 of FIG. 6, will be described in more detail in accordance with an embodiment of the present invention. Channel identification byte 604 includes six bits 710a-f that are arranged to identify a channel. The six bits are typically bits zero through five of channel identification byte 604. In general, channel identification byte 604 is arranged to effectively inform a receiving end, e.g., a receiver of the signal or frame of which channel identification byte 604 is a part, regarding where the signal or frame is intended to be routed.

Figure 7B:
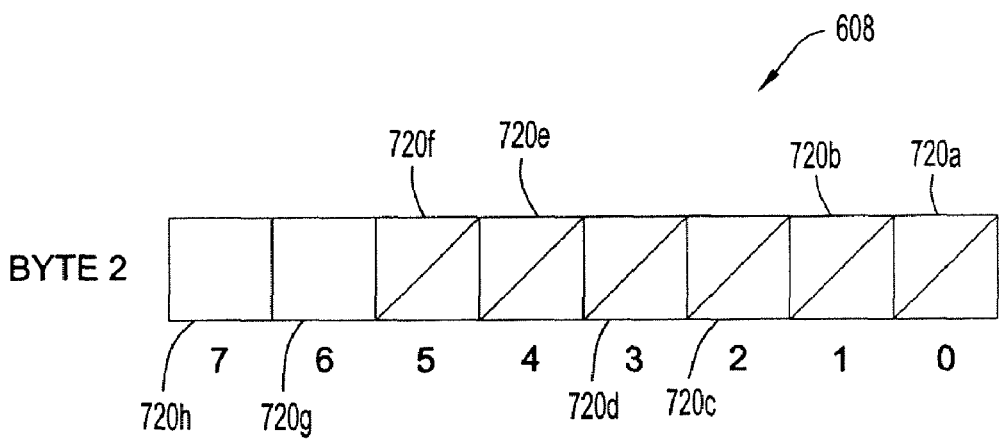
FIG. 7B is a block diagram representation of a reserved byte, i.e., reserved byte 608 of FIG. 6, in accordance with an embodiment of the present invention.

FIG. 7B is a block diagram representation of a reserved byte, i.e., reserved byte 608 of FIG. 6, in accordance with an embodiment of the present invention. Reserved byte 608 may generally include up to eight bits 720a-h that may be reserved for substantially any suitable purpose. In one embodiment, however, reserved byte 608 designates six bits 720a-f for use as reserved bits.

Figure 7C:
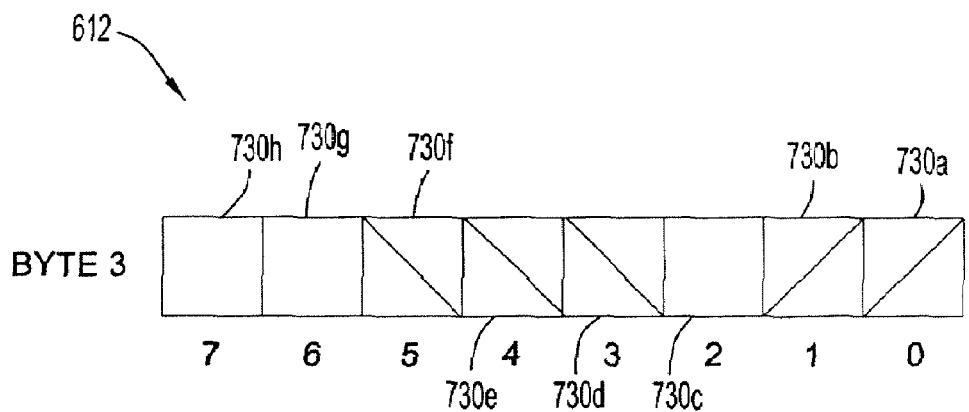
FIG. 7C is a block diagram representation of a payload type, PTI, and client signal fail byte, i.e., byte 612 of FIG. 6, in accordance with an embodiment of the present invention.

FIG. 7C is a block diagram representation of a payload type, PTI, and client signal fail byte, i.e., byte 612 of FIG. 6, in accordance with an embodiment of the present invention. Payload, PTI, and client signal fail byte includes two bits 730a, 730b that are arranged to identify client signal failures. By way of example, when bits 730a, 730b have values of "1" and "0," respectively, the indication may be a loss of client signal, whereas when bits 730a, 730b have values of "0" and "1," respectively, the indication may be a loss of character synchronization.

Bits 730c-e are arranged to indicate a packet type. When bits 730c-e each have values of zero, the packet may be identified as containing data. Alternatively, when bits 730c-e have values of "0," "0," and "1," respectively, the packet may be identified as a client management frame.

Figure 7D:
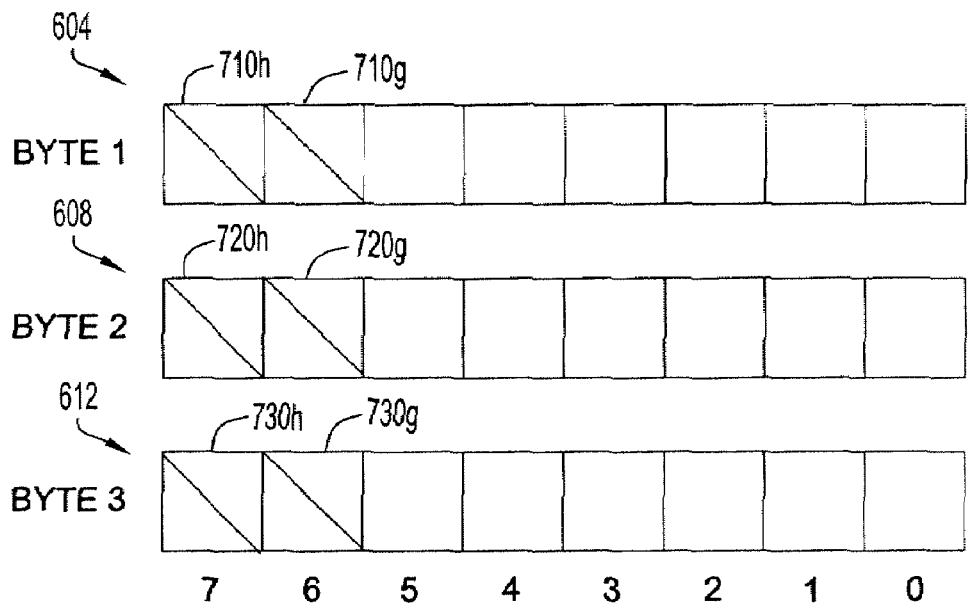
FIG. 7D is a block diagram representation of stuffing bytes that include justification opportunity bits in accordance with an embodiment of the present invention.

A frame may transport a byte more or a byte less than normally transported by a typical frame due to clocking issues, as will be appreciated by those skilled in the art. As such, justification opportunity bits may be provided in addition to negative justification opportunity byte 616 of FIG. 6. Justification opportunity bits may be interspersed throughout the stuffing bytes of FIG. 6, as shown in FIG. 7D. Seventh and eighth bits 710g, 710h of channel identification byte 604 may be reserved for use as justification opportunity bits. Similarly, seventh and eighth bits 720g, 720h of reserved byte 608 and seventh and eighth bits 730g, 730h of payload type, PTI, and client signal fail byte 612 are also reserved for use as justification opportunity bits.

Figure 8:
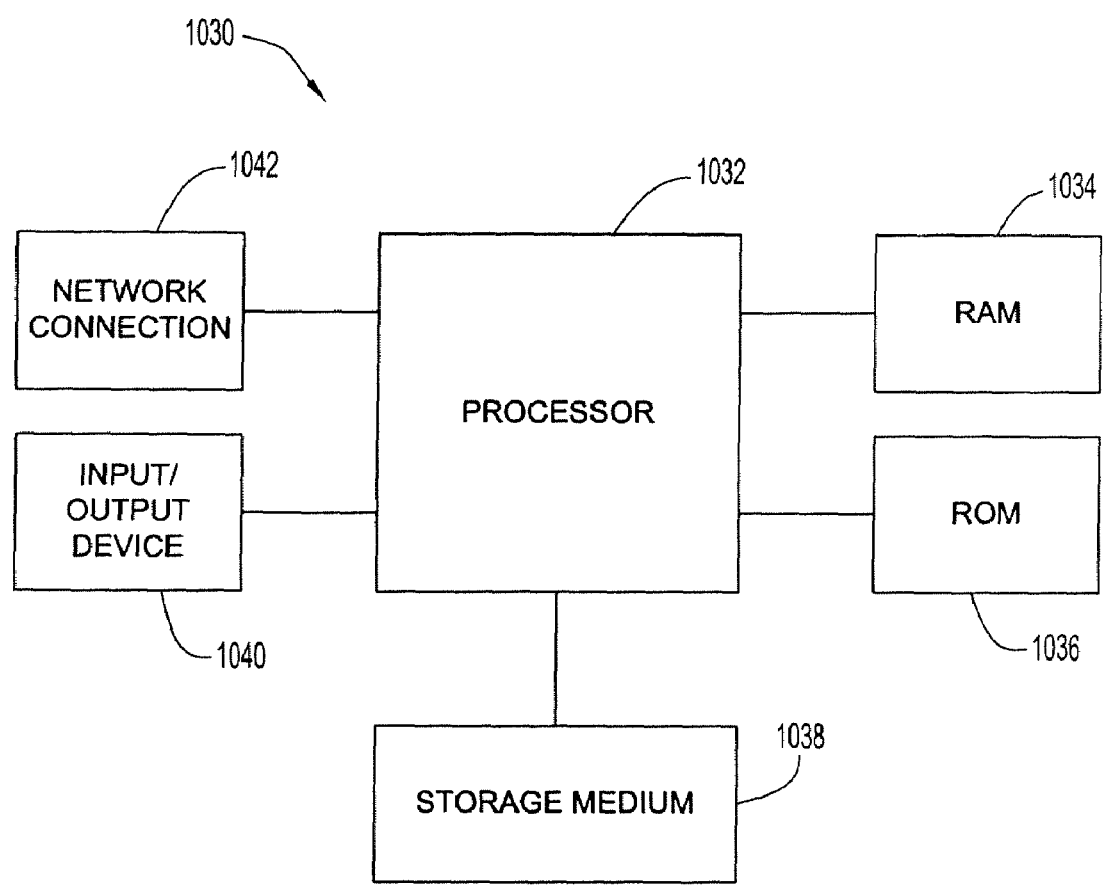
FIG. 8 is a block diagram representation of a typical, general purpose computing device or computer system suitable for implementing the present invention.

FIG. 8 illustrates a typical, general purpose computing device or computer system suitable for implementing the present invention. The computing device or computer system may be a part of a network element or node that is associated with a user or a customer that utilizes a shared container. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code devices, data, and the like. Typically, mass memory device 1038 is a storage medium such as, for example, a hard disk which is generally slower than primary storage devices 1034, 1036. It should be appreciated that the information retained within mass memory device 1038, may, in appropriate cases, be incorporated in standard fashion as part of RAM 1036 as virtual memory. A specific primary storage device 1034 such as a CD-ROM, a DVD, or a flash memory device may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, the number of stuffing bytes added to an OTN frame to allow a container to be shared may vary. In other words, while four stuffing bytes have been described, fewer than four stuffing bytes or more than four stuffing bytes may instead be used.

Stuffing bytes have generally been described as being inserted into fixed stuff bytes in a payload of an OTN frame. In addition to the location of fixed stuff bytes within the payload being widely varied, the stuffing bytes may also be inserted into areas of the payload that are not associated with fixed stuff bytes.

A container may be shared by any number of users. In other words, while sharing a container between two users has been described, the number of users who share a container may vary widely. By way of example, an ODU3 container may be shared by four users which each use a 10 G channel. Generally, substantially each channel associated with a container may be allocated to a different user when stuffing bytes are used to enable the container to be shared.

Using stuffing bytes to enable containers to be shared is not limited to being applicable to systems which utilize ODU1, ODU2, and ODU3 containers By way of example, the present invention may be implemented with respect to OTU1, OTU2, OTU3, and other TDM containers such as those associated with but not limited to SONET, ANSI T1.105, SDH, and ITU-T G.707. Further, the use of stuffing bytes may also enable an ODU1 container to carry a pair of Gigabit Ethernet (GbE) streams that are associated with a plurality of users, as well as to enable an ODU3 container to carry up to approximately four 10 GbE streams that are associated with a plurality of users. That is, stuffing bytes may generally enable ODU containers to carry a number of GbE streams, or a number of 10 GbE streams if appropriate, associated with different users.

The various data rates associated with the present invention are generally a result of overclocking. It should be appreciated, however, that while overclocking increases the bandwidth that may be carried in a container, it is not necessary for overclocking to occur when the present invention is implemented. Therefore, the present examples are to be considered as illustrative and not restrictive, and the invention is not to be limited to the details given herein, but may be modified within the scope of the appended claims.

What is claimed is:

1. A network element comprising:
a processor configured to generate a first frame associated with a first user having a fixed stuff area, the fixed stuff area includes a first set of bits to provide channel identification information, a second set of bits to provide justification information, and a third set of bits to indicate at least one selected from the group including payload type information and client signal fail information, wherein the fixed stuff area includes a first byte, a second byte, and a third byte, the first set of bits being included in the first byte and the third set of bits being included in the third byte, and the second set of bits being included in the first byte, the second byte, and the third byte;

a memory configured to store the first frame, data, and instructions; and a network interface configured to place the first frame within a container for transport through an optical transport network.

2. The network element of claim 1 wherein the processor is further configured to generate the fixed stuff area that includes a fourth byte containing justification information.

3. The network element of claim 2 wherein the processor is configured to generate negative justification information in the fourth byte.

4. The network element of claim 1 wherein the processor is configured to generate the first set of bits in a first five bits of the first byte.

5. The network element of claim 1 wherein the processor is configured to generate the second set of bits in a last two bits of the first byte, a last two bits of the second byte, and a last two bits of the third byte.

6. The network element of claim 1 wherein the processor is configured to store payload type information in a fourth through sixth bits of the third byte and store the client signal fail information in a first two bits of the third byte.

7. The network element of claim 1 wherein the processor is configured to generate a second frame associated with a second user and the network interface is configured to place the second frame in the container.

8. A network element comprising:
means for generating a frame, the frame having fixed stuff bytes; and
means for inserting a plurality of sets of bits into the fixed stuff bytes of the frame, the plurality of sets of bits including a first set of bits, a second set of bits, and a third set of bits, wherein the first set of bits is arranged to identify a channel, the second set of bits is arranged to identify at least one selected from the group including a payload type and a client signal fail indication, and the third set of bits is arranged to indicate a justification opportunity, wherein the fixed stuff bytes includes a first byte, a second byte, and a third byte, the first set of bits being included in the first byte and the third set of bits being included in the third byte, and wherein the second set of bits is included in the first byte, the second byte, and the third byte.

9. A method comprising:
creating a first frame associated with a first user including an overhead area and a payload area, wherein the payload area includes fixed stuff bytes;
inserting a plurality of sets of bits into the fixed stuff bytes of the first frame, the plurality of sets of bits being configured to identify a channel associated with the first frame, wherein the plurality of sets of bits includes a first set of bits, a second set of bits, and a third set of bits, wherein the first set of bits identifies a channel, the second set of bits indicates a justification opportunity, and the third set of bits identifies at least one selected from the group including a payload type and a client signal fail indication, and wherein the fixed stuff bytes include a first byte, a second byte, and a third byte, the first set of bits being included in the first byte and the third set of bits being included in the third byte, and the second set of bits is included in the first byte, the second byte, and the third byte; and
encompassing the first frame in a container.

10. The method of claim 9 wherein the container is one selected from the group including an optical data unit1 (ODU1) container, an ODU2 container, and an ODU3 container.

11. The method of claim 9 wherein the fixed stuff bytes further include a fourth byte, and the justification information is further included in the fourth byte.

12. The method of claim 9 wherein the first set of bits is a first five bits of the first byte.

13. The method of claim 9 wherein the second set of bits is a last two bits of the first byte, a last two bits of the second byte, and a last two bits of the third byte.

14. The method of claim 9 wherein the payload type information is stored in fourth through sixth bits of the third byte and the client signal fail information is stored in a first two bits of the third byte.

15. The method of claim 9, further comprising repeating the method for a second frame associated with a second user.

16. A method comprising:
receiving a container configured to carry frames from a plurality of users, wherein the container includes a frame having an overhead area and a payload area, the payload area including fixed stuff bytes;
obtaining the frame;
reading a plurality of sets of bits included in the fixed stuff bytes of the frame, the plurality of sets of bits identifying a channel associated with the frame, wherein the fixed stuff bytes include a first byte, a second byte, and a third byte, the first set of bits being included in the first byte, the third set of bits being included in the third byte, and the second set of bits being included in the first byte, the second byte, and the third byte; and
determining an action to take with respect to the frame, wherein determining the action to take with respect to the frame includes determining the action based on contents of the plurality of sets of bits.

17. The method of claim 16 wherein the container is one selected from the group including an optical data unit1 (ODU1) container, an ODU2 container, and an ODU3 container.

18. The method of claim 16 wherein the fixed stuff bytes further include a fourth byte, and the justification information is further included in the fourth byte.

19. The method of claim 16 wherein the first set of bits is a first five bits of the first byte.

20. The method of claim 16 wherein the second set of bits is a last two bits of the first byte, a last two bits of the second byte, and a last two bits of the third byte.

21. The method of claim 16 wherein the payload type information is stored in fourth through sixth bits of the third byte and the client signal fail information is stored in a first two bits of the third byte.

22. The method of claim 16 wherein the container includes a plurality of frames associated with a plurality of users.

23. A network element comprising:
a receiver configured to:
receive a container transported through an optical transport network containing a first frame associated with a first user with a fixed stuff area, wherein the fixed stuff area includes a first set of bits arranged to provide channel identification information, a second set of bits arranged to provide justification information, and a third set of bits arranged to indicate at least one selected from the group including payload type information and client signal fail information;
extract the first frame from the container;
identify the first set of bits, the second set of bits, and the third set of bits, wherein the fixed stuff area includes a first byte, a second byte, and a third byte, the first set of bits being included in the first byte, the third set of bits being included in the third byte, and the second set of bits being included in the first byte, the second byte, and the third byte; and a processor configured to process the first frame based on information obtained from the first set of bits, the second set of bits, and the third set of bits.

24. The network element of claim 23 wherein the fixed stuff area further includes a fourth byte, and the justification information is further included in the fourth byte.

25. The network element of claim 24 wherein the justification information included in the fourth byte is negative justification information.

26. The network element of claim 23 wherein the first set of bits is a first five bits of the first byte.

27. The network element of claim 23 wherein the second set of bits is a last two bits of the first byte, a last two bits of the second byte, and a last two bits of the third byte.

28. The network element of claim 23 wherein the payload type information is stored in fourth through sixth bits of the third byte and the client signal fail information is stored in a first two bits of the third byte.

29. The network element of claim 23, wherein container contains a second frame associated with a second user, the receiver is further configured to identify bits in a fixed stuff area of the second frame, and the processor is further configured to process the second frame based on information obtained from the identified bits in the fixed stuff area of the second frame.

* * * * *

UNITED STATES PATENT AND TRADEMARK OFFICE
CERTIFICATE OF CORRECTION

PATENT NO. : 7,664,139 B2  Page 1 of 1
APPLICATION NO. : 11/162619
DATED : February 16, 2010
INVENTOR(S) : Loprieno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1184 days.

Signed and Sealed this

Twenty-eighth Day of December, 2010

David J. Kappos
*Director of the United States Patent and Trademark Office*